United States Patent
Dubief

(10) Patent No.: US 11,690,472 B2
(45) Date of Patent: Jul. 4, 2023

(54) APPARATUS AND METHOD FOR BREWING INFUSION MATERIAL

(71) Applicant: SOCIETE DES PRODUITS NESTLE S.A., Vevey (CH)

(72) Inventor: Flavien Florent Dubief, Champagne (CH)

(73) Assignee: Societe des Produits Nestle S.A., Vevey (CH)

(*) Notice: Subject to any disclaimer, the term of this patent is extended or adjusted under 35 U.S.C. 154(b) by 464 days.

(21) Appl. No.: 16/761,154

(22) PCT Filed: Oct. 30, 2018

(86) PCT No.: PCT/EP2018/079739
§ 371 (c)(1),
(2) Date: May 1, 2020

(87) PCT Pub. No.: WO2019/086472
PCT Pub. Date: May 9, 2019

(65) Prior Publication Data
US 2020/0268192 A1     Aug. 27, 2020

(30) Foreign Application Priority Data
Nov. 2, 2017   (EP) .................................... 17199679

(51) Int. Cl.
A47J 31/20    (2006.01)
A47J 31/46    (2006.01)
A47J 31/00    (2006.01)
A47J 31/44    (2006.01)
A47J 31/52    (2006.01)

(52) U.S. Cl.
CPC ............. *A47J 31/20* (2013.01); *A47J 31/002* (2013.01); *A47J 31/4492* (2013.01); *A47J 31/461* (2018.08); *A47J 31/52* (2013.01)

(58) Field of Classification Search
CPC ...... A47J 31/002; A47J 31/20; A47J 31/4492; A47J 31/461; A47J 31/52
USPC .......................................................... 426/433
See application file for complete search history.

(56) References Cited

U.S. PATENT DOCUMENTS

| | | | | |
|---|---|---|---|---|
| 4,787,299 A | * | 11/1988 | Levi ...................... | A47J 31/402 99/295 |
| 2007/0137495 A1 | * | 6/2007 | Talbert .................... | A47J 31/20 99/286 |
| 2009/0004351 A1 | * | 1/2009 | Maurer ............... | A47J 31/0631 99/298 |

(Continued)

FOREIGN PATENT DOCUMENTS

| | | |
|---|---|---|
| DE | 4302899 | 3/1994 |
| GB | 2505659 | 3/2014 |
| WO | 2016207846 | 12/2016 |

*Primary Examiner* — Dana Ross
*Assistant Examiner* — Joseph W Iskra
(74) *Attorney, Agent, or Firm* — K&L Gates LLP

(57) ABSTRACT

The invention concerns an apparatus (1) for brewing infusion material, said infusion material being hold in a filtering packet (2), said apparatus comprising: —a brew container (11) configured for holding water and a filtering packet of infusion material, and 10—a basket (12) configured for holding the filtering packet and configured for being hold in the brew container, and—an actuator (13) to rotate the basket inside the brew container.

20 Claims, 5 Drawing Sheets

(56) References Cited

U.S. PATENT DOCUMENTS

2013/0032537 A1\* 2/2013 Burbank ............. A61M 1/1668
  210/646
2017/0035251 A1\* 2/2017 Van Luven ........... F25D 31/007
2019/0075957 A1\* 3/2019 Rivera .................. A47J 31/002

\* cited by examiner

APPARATUS AND METHOD FOR BREWING INFUSION MATERIAL

CROSS REFERENCE TO RELATED APPLICATIONS

The present application is a National Stage of International Application No. PCT/EP2018/079739, filed on Oct. 30, 2018, which claims priority to European Patent Application No. 17199679.6, filed on Nov. 2, 2017, the entire contents of which are being incorporated herein by reference.

FIELD OF THE INVENTION

The present invention relates to apparatus and method to brew infusion material, in particular roast and ground coffee with cold water.

BACKGROUND OF THE INVENTION

The preparation of cold brewed coffee consists in extracting roast and ground coffee with water at ambient or cold temperature.

Extraction can happen with the classical dripping method: cold water drips on a filter filled with roast and ground coffee, and brewed coffee is filtered out downstream the filter in a dispenser.

Alternatively extraction can consist in steeping roast and ground coffee in water at cold temperature during several hours and then filtering coffee ground from the resulting liquid beverage.

One disadvantage of both methods is the time it needs to get the extraction of coffee at cold temperature since extraction lasts during several hours. The operator must anticipate the time of the preparation in order to get the beverage ready at the time of consumption.

Another disadvantage of the steeping method is that it is time consuming when it comes to removal of coffee cake and cleaning of the apparatus. In the second method, after filtration of the beverage, many particles of ground coffee remains in the preparation container. Long and thorough water rinsing is necessary. When an important quantity of cold brewed coffee is produced, the handling of the different containers used to brew or to store and of the filter becomes heavy.

Some solutions have been proposed to answer these problems.

In WO 2016/207846, it has been proposed to use a device comprising a brew container for holding water and a basket for holding a packet of coffee ground, the basket being inserted in the container. The walls of the packet are made of a filtering material. Having coffee ground hold in a packet and said packet hold in a basket enables an easier removal of coffee ground from the container at the end of the process.

This prior art also proposed to create a circulation of liquid inside the brew container.

Different implementations are proposed:
one consists in adding a stirrer at the bottom of the brew container in the lid of the brew container. Yet, the flow of liquid generated by this stirrer is local and not controlled within the rest of the container.
another consists in providing vanes along the internal lateral sides of the brew container and rotating the brew container. Since the basket is attached to the brew container, the basket holding roast and ground coffee rotates similarly and the effect of the agitation of roast and ground coffee by the fluid is limited. In addition, the force required to rotate the assembly of the brew container, the basket and the water hold inside is huge.
another consists in providing a pump for sucking the liquid from the brew container and recirculating it back to the brew container. Again the flow of liquid emerging back in the brew container is not controlled and has no direct effect on the brewing. In addition, the pump increases the cost of the apparatus.

These implementations are expansive and have not enabled a drastic decrease of the time of preparation since brewing still requires at least four hours to get cold brewed coffee.

In U.S. 2017/0086473, another type of cold brewed coffee device has been proposed to automatize the process and limit the monitoring or interaction by the user.

Similarly to the precedent prior art, the brewing method consists in using a packet of roast and ground coffee, a part of the walls of said packet being made of a filtering material, and introducing said cartridge in a brewing chamber. Cold water is introduced inside the brewing chamber to get the cold extraction.

The brew chamber can include an agitator to reduce the brew time. Different types of agitator are proposed:
the agitator can move the coffee packet or the packet holder during brewing so that the water is agitated, or
the agitator can be an ultrasonic transducer, or
the agitator may be a pump designed to circulate air within the chamber or to recirculate water in the brew chamber, or
the agitator may be a fin.

In addition, the brew chamber includes an extractor to squeeze, twist or compress the coffee ground packet at the end of the brewing process to achieve maximum yield and remove excess water.

This device answers the problems of reducing user's interaction. Yet the apparatus is complex due to the presence of a new device in the brew chamber, specifically the extractor to squeeze, twist or compress the coffee ground packet. This device requires a coupling to an existing motor or the addition of a new motor. In addition this device creates a new cleaning task. Finally, this apparatus does not answer the problem of long preparation time; the cold brewed process still requires 12 to 24 hours.

An object of the present invention is to provide an alternative apparatus to reduce the time for brewing roast and ground coffee with cold or ambient water.

It would be advantageous to provide a cold brewed apparatus and method enabling automatic preparation, in particular apparatus that is easy and simple to use for a person that is no used to prepare cold brew coffee.

It would be advantageous to provide a cold brewed apparatus and method enabling easy handling of the coffee cake and easy cleaning of the apparatus.

It would be advantageous to provide a brewing apparatus for the preparation of beverage from various types of infusion material and either with hot or cold water.

SUMMARY OF THE INVENTION

In a first aspect of the invention, there is provided an apparatus for brewing infusion material, said infusion material being hold in a filtering packet.

The apparatus comprises:
a brew container configured for holding water and a filtering packet of infusion material, and a basket configured for holding the filtering packet and configured for being hold in the brew container, said basket comprising a bottom wall, a top wall and a lateral side wall, said side wall extending from the bottom wall to the top wall, and said bottom and top walls comprising openings, an actuator to rotate the basket on itself inside the brew container and around the central axis extending between the top wall and the bottom wall.

The basket of the apparatus comprises blades, said blades being configured to generate an axial flow of water through the basket, when the basket is rotated within the brew container filled with water.

The apparatus is configured for brewing an infusion material. Infusion material can be roast and ground coffee, tea leaves, herbal tea leaves, dried fruits or combination thereof. The infusion material is packed in a filtering packet.

By "filtering packet" it is meant a packet wherein at least a part of the walls are made of a filtering material. This filtering material is able to hold and retain infusion material such as particles of roast and ground coffee or leaves of tea leaves, but it enables water to freely flow through.

Preferably, the apparatus is configured for preparing cold brewed coffee from roast and ground coffee packed in a filtering packet.

The apparatus comprises a brew container configured for holding water. As a result, water is retained in this brew container and the filtering packet holding the infusion material can be fully immersed inside during a period of time. Usually, the brew container presents an internal cylindrical shape.

Generally the brew container comprises an outlet and an outlet valve in order to dispense brewed coffee therefrom once the brewing operation is finished. This outlet is usually positioned at the bottom of the brew container. The valve enables the control of the brewing time, in particular in an automatic way, the opening of the valve being controlled by the control unit of the apparatus, eventually set by the operator.

According to an alternative mode the outlet valve can be manually actuated by the operator.

The apparatus can comprise an actuator like a button or a lever that indirectly moves the valve.

Preferably, the outlet comprises a pipe made of a flexible and resilient material and the valve device is a pinching valve. The flexible and resilient material can be silicone rubber or any other material known for its flexible and resilient properties and food agreed.

Generally the pinching valve comprises an abutment and at least one element movable between:
a first position wherein said valve pinches the part of the tube made of a flexible and resilient material against the abutment, and
a second position wherein said valve releases the part of the tube made of a flexible and resilient material.

The movable element of the pinching valve can be moved between the two positions according to a translation movement or a rotational movement or a combination of these both movements. Usually the pinching valve pinches the tube along a direction perpendicular to the tube—that is a direction essentially perpendicular to the vertical axis.

Such pinching valve presents the advantage of avoiding any contact between the beverage and the valve. In addition, the valve is easily dismountable. The pipe made of a flexible and resilient material can be replaced easily too if necessary e.g. further to deposit of beverage residues.

The apparatus comprises a basket configured for holding the filtering packet. The basket comprises a bottom wall, a top wall and a lateral side wall. The side wall extends from the bottom wall to the top wall. The filtering packet can be hold inside these walls.

As a basket, said device comprises openings, said openings being designed to enable the free circulation of water there through. Yet the openings are dimensioned in order to prevent the filtering packet of infusion material from leaving the basket or being damaged further to too strong deformation during high speed rotation. The openings can be very wide as long as the packet cannot escape therefrom. The basket comprises upper and lower openings, and optionally lateral openings, enabling the full immersion of the packet in water hold in the brew container.

The basket is configured for retaining the filtering packet. It can comprise an openable lid in order to enable the introduction of the packet inside and then to retain the packet inside.

In addition the basket is configured for being hold inside the brew container of the apparatus and for being rotated inside the brew container while the brew container remains immobile. The basket usually presents a smaller volume than the internal volume of the brew container so that it is able to be freely rotated inside the brew chamber without any friction.

Preferably the basket and the filtering packet extends through the whole volume of the brew container so that infusion material can flow through the whole brew container.

Preferably, the basket presents the same external shape as the internal shape of the brew container. This guarantees a uniform path for water between the internal walls of the brew container and the external walls of the basket and an homogeneous brewing.

Generally the basket presents a symmetric form like a polygonal shape. Preferably the basket presents the shape of a cylinder.

The apparatus comprises an actuator to rotate the basket on itself relatively to the brew container and around the central axis extending between the top wall and the bottom wall.

The actuator can be a rotating motor comprising a drive shaft cooperating directly or indirectly with the basket through a wall of the brew container.

According to one mode, the basket can be mechanically attached or connectable to the shaft of the motor (direct cooperation).

According to another mode, the motor can drive the basket through a magnetic drive effect through the floor of the container body (indirect cooperation).

Generally, the basket comprises means for coupling with the actuator either directly or indirectly. This coupling means can be mechanical such as gear, slots or magnetic such as magnets.

Preferably, the actuator and the basket are configured to spin the basket on itself along a vertical axis.

According to the preferred embodiment, the basket present the shape of a cylinder and the actuator is able rotate the basket around the longitudinal axis of the cylinder The basket of the apparatus comprises blades. These blades are configured to generate a flow of water when the basket is rotated within the brew container filled with water. The blades are configured so that when they rotate inside water, as part of the rotating basket, these blades create a flow of water extending along the direction of the central axis of the basket and inside the basket. Consequently, the flow created by the blades enters inside the basket, follows a direction parallel to the rotation axis inside the basket and exits the basket through the opposed wall.

As long as the basket rotates, the movement of water happens and the flow of water exiting the basket is recirculated inside the basket by the blades.

As a result, when the basket holds a filtering packet of infusion material, this flow of water enters, flows through and exits the packet in a recirculating movement. This particular path of the flow increases extraction by applying several effects:

forcing water to enter the packet induces an increased contact of water with all the particles or leaves of infusion material, forcing water to exit the basket enables extract from infusion material to leave the basket and a new fresh flow of water to contact the infusion material. The difference of extract concentration at the surface of infusion material boosts the extraction since water saturated by infusion material extract is moved away.

forcing water to recirculate in a loop movement enables a mixing of extracted beverage portions and reiterates the above steps.

The blades guide efficiently water flow inside the basket. As a result, the energy provided by actuator is totally dedicated to the production of an efficient flow of water designed to increase coffee extraction, contrary to stirrers or recirculating pumps of the state of the art.

Usually the central axis extending between the top wall and the bottom wall of the basket is vertical and the flow of water generated by the blades is vertical.

According to the preferred embodiment, the basket comprises blades at its bottom wall designed to direct the flow of water axially inside and through the basket. Depending on the direction of rotation of the basket, the flow of water can be directed upwardly or alternatively downwardly inside the basket. Preferably, the basket is rotated so that water enters at the bottom wall of the basket and exits at the top wall of the basket.

Similarly, but in a less preferred embodiment, the basket can comprise blades at its top wall designed to direct the flow of water axially inside and through the basket further to the rotation of the basket inside water. In this embodiment, it must be verified that the top of the basket is sufficiently covered by water to get the generation of flow by the blades rotation.

Again, it is preferred that the basket is rotated so that water enters at the bottom wall of the basket and exits at the top wall of the basket.

Preferably the blades are present at the external side of the basket. Usually no blade is present in the internal volume of the basket.

Preferably the blades are curved in order to initiate a tangential flow of water at the bottom or at the top wall and to transform this flow into an axial flow inside the basket.

Preferably the blades extend radially along the bottom wall or the top wall from the lateral side wall in direction of the centre of the basket. As a result the axial flow of water can cross almost the whole internal cross section of the basket.

The blades can present the design of an axial flow impeller, such as a pitched blade turbine or a propeller.

Preferably, the apparatus comprises a water supply tank. Usually the water supply thank comprises a water valve to control the introduction of water in the brew container. As a result, brew container can be automatically fed with water, the valve can be controlled automatically.

Preferably the water supply tank comprises a filter configured for filtering water before it is introduced in the brew container. Preferably this filter eliminates minerals or chemical pollutants that may impact the taste of the final beverage.

In a particular mode, the apparatus can comprise a support means configured for holding the water supply tank either in a position above the brew container or in a position away from the top of the brew container. Consequently, the operator is able to position the water supply tank above the brew container in order to fill the brew container with water or to position the water supply tank away from the brew container in order to get access to the top of the brew container, for example in order to introduce or remove the basket and the filtering packet in or out.

Preferably, the apparatus comprises a dispenser container configured for receiving brewed coffee from the brew container. This dispenser container is usually connected with a dispensing valve of the brew container. As a result, at the end of the brewing operation, the brewed beverage can be fully dispensed in the dispenser container and consequently the brewing operation is stopped. This is advantageous when the brewing time is critical and contact between the infusion material and water must be stopped to avoid over brewing. This is particularly the case when brewing happens with hot water.

According to one embodiment, this dispenser container can be a serving container, like a carafe.

Preferably the apparatus can comprise refrigerated means. This refrigerated means can be configured to cool at least one of the water supply tank, the brew container and/or the dispenser container depending on the implemented embodiment. This embodiment enables the preparation of cold brewed coffee or cold tea.

In this embodiment, the apparatus is usually deprived of water heater.

The apparatus can comprise an interface in order to enable the operator to set brewing parameters such as brewing temperature, water volume, rotation speed, brewing time and combinations thereof. Alternatively or in addition, the interface can enable the operator to set the desired strength and/or taste of the beverage, the apparatus automatically setting the brewing parameters corresponding to this strength and/or taste.

In a second aspect, there is provided a method for brewing a beverage with the apparatus such as described above, comprising the steps of:

positioning a filtering packet of infusion material in the basket and the basket in the brew container, introducing water in the brew container so that the filtering packet is immersed in water, brewing by rotating the basket on itself inside water and generating an axial flow of water through the basket.

As mentioned above the infusion material can be roast and ground coffee, tea leaves, herbal tea leaves, dried fruits or combination thereof. Preferably the infusion material is roast and ground coffee.

The infusion material is packed in a filtering packet. As mentioned above, by "filtering packet" it is meant a packet wherein at least a part of the walls are made of a filtering material. This filtering material is able to hold and retain particles of roast and ground coffee or leaves of tea leaves but it enables water to flow through.

The filtering material can be made of paper, textile, plastic. The porosity usually depends on the size of the particle of leaves of infusion material.

It shall be sufficiently solid to avoid breaking during rotation at high speed in the basket.

Preferably, the filtering packet presents a shape conformal to the internal shape of the basket. Consequently, the infusion material is free to flow inside the whole internal volume of the basket. Usually the filtering packet presents a cylindrical shape, yet any shape can be used.

The step of introducing water in the brew container can be implemented before or after the basket and the filtering packet are introduced in the brew container. It is preferred to introduce the basket in the brew container firstly and then to introduce water because it is more convenient for the operator.

Water can be hot or cold.

According to the preferred embodiment, the method enables the preparation of col brewed coffee. The filtering packet comprises roast and ground coffee and water is cold. By "cold water", it is meant water with a temperature of at most the ambient temperature, that is at most 30° C., preferably at most 25° C.

Preferably ground coffee is hold in a filtering packet such as described above. Preferably the filtering packet defines an internal volume and at most 50%, preferably 25 to 30%, of said internal volume is filled with ground coffee. This value is to be understood for roast and ground coffee that has not yet been brewed. As a result, during brewing coffee ground is hold in the packet in a loose manner even when particles have swollen further to the contact with water. The empty volume provides space for ground coffee expansion and ground coffee movement. The path of water flow through the packet is facilitated too.

Preferably the size of the particles of roast and ground coffee in the filtering packet is of at least 200 μm, preferably at least 500 μm. This size avoids the presence of fine in the final beverage that would not be retain by commonly used filters.

According to this preferred embodiment, cold water is introduced in the brew container. Water is introduced in a quantity such that the filtering packet is fully immersed in water.

In addition, the filtering packet holds a quantity of roast and ground coffee enabling the preparation of cold brewed coffee from said quantity of water.

In a preferred embodiment, cold water and roast and ground coffee are introduced in a ratio of 50 to 200 g of roast and ground coffee for 1 l of water.

Preferably, during brewing, the actuator rotates the basket at a speed of at most 200 rpm, even at most 120 rpm, preferably at least 5 rpm. Such a rotation speed generates a gentle flow of water in the filtering packet enabling the particles or leaves to be dispersed in water inside the basket, separating particles or leaves from each other.

This rotation can happen either sequentially or continuously.

Preferably, the rotating operation is discontinuous. Discontinuous rotation enables particles or leaves to settle and brew quietly according to the state of the art, before being dispersed again. Preferably the length of time for rotation is inferior to the length of time for no rotation. For example, for cold brewed coffee, rotation can happen every 5 minutes during less than 15 seconds.

The rotation conditions (discontinuous or not, speed, time length) can depend on the type of infusion material used, on the temperature of water, on the desired strength or taste of the final beverage.

Preferably, at the end of the brewing operation, the method comprises the further step of dispensing the beverage issued from brewing step either totally or partly.

It is preferred that the beverage issued from brewing step is totally dispensed at the end of the brewing operation. As a result, brewing is stopped and the taste of the beverage is frozen. This total dispensing is particularly recommended for the preparation of beverage with hot water. Otherwise, brewing continues and beverage does not present the desired taste.

Preferably, during or after the dispensing step, and once the level of beverage is lower to the bottom of the basket, the filtering packet is centrifuged to expel remaining beverage, usually at a speed superior to 120 rpm, even superior to 200 rpm, preferably at most 2000 rpm.

Since the actuator is able to rotate the filtering packet, rotation can be used to centrifuge the packet at the end of the preparation. Then, after centrifugation the operator can remove the packet from the brew container in a proper manner. During this operation, the brew container has been emptied until the level of beverage has reached the underside of the basket meaning that water remains inside the packet only. If blades are positioned at the bottom of the basket, the brew container is emptied so that the level of beverage is below the underside of the blades. The rotation of the basket does not induce the sucking of beverage inside the packet (because the level of beverage is lower than the blades) but the expelling of beverage therefrom only.

According to a third aspect, there is provided a system of an apparatus such as described above and a filtering packet of infusion material.

Preferably, the filtering packet holds roast and ground coffee, the filtering packet defines an internal volume and less than 50%, preferably 25 to 30% of said internal volume is filled with roast and ground coffee.

In one embodiment of the system:
a code can be associated to the filtering packet, and
the apparatus can comprise a code reader configured to read the code, wherein the code provides information related to the nature of the infusion material, brewing parameters or combinations thereof and the apparatus is configured to apply read brewing parameters or to define brewing parameters based on read information.

The code is generally used to provide brewing parameters such as brewing time, brewing temperature, water quantity, rotation speed and/or rotation sequence.

In one mode, the code can provide information defining the brewing parameters and the control unit of the apparatus is configured to read and apply these parameters.

Usually, these parameters depend from the nature of the infusion material and from the characteristics of the infusion material. For example, coffee brewing parameters are different from tea brewing parameters. In addition, for roast and ground coffee, these parameters depend from coffee origin, roasting level, grinding size.

In another mode, the code can provide information about the nature of the infusion material only and the apparatus can comprise a control unit adapted to set optimal parameters based on this nature and on a memory storing process parameters.

Whatever the type of coded information, the control unit can be configured to take into account the customised taste desired by the consumer based on the nature of the infusion material. The control unit is able to adapt the brewing time, the rotation cycle, the temperature of water accordingly.

In the present application the terms "internal", "external", "top", "bottom" and "lateral" are used to describe the relational positioning of features of the invention. These terms should be understood to refer to the apparatus in its normal orientation when used for the production of a beverage form infusion material as shown in FIGS. 1, 3A-3C and 4.

The above aspects of the invention may be combined in any suitable combination. Moreover, various features herein may be combined with one or more of the above aspects to provide combinations other than those specifically illustrated and described. Further objects and advantageous features of the invention will be apparent from the claims, from the detailed description, and annexed drawings.

BRIEF DESCRIPTION OF THE DRAWINGS

The characteristics and advantages of the invention will be better understood in relation to the following figures.

DETAILED DESCRIPTION OF THE DRAWINGS

Figure 1:
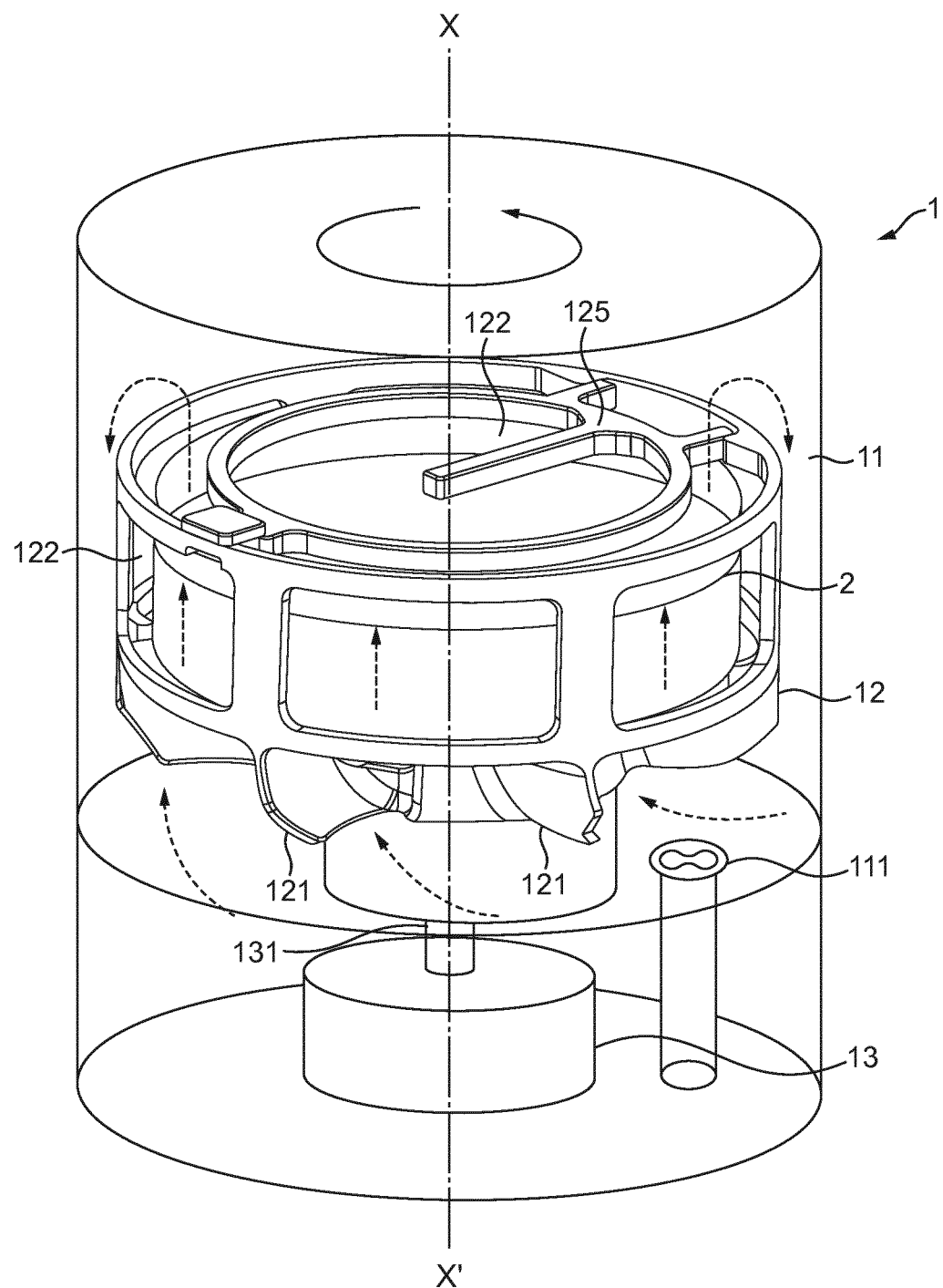
FIG. 1 is a schematic view of an apparatus according to the invention.

FIG. 1 illustrates a simple embodiment of an apparatus 1 for preparing a beverage from an infusion material, in particular coffee from roast and ground coffee, preferably cold brewed coffee.

The apparatus comprises a brew container 11. This container can be filled with water and a basket 12 can be introduced inside too.

This basket 12 is configured for holding a filtering packet 2 of infusion material, such as roast and ground coffee. The basket comprises an openable lid 125 to introduce and remove the packet 2 inside. The basket can be positioned in the brew container in order to be completely immersed in water. The basket can comprise a handle to easily hold it.

The basket comprises large openings 122 enabling a full immersion of the infusion material inside water. The basket provides the function of retaining the filtering packet inside while enabling contact between infusion material with water. Large openings enable full immersion and rapid wetting of infusion material when introduced in water or when water is introduced inside the brew container holding the basket and the filtering packet. The basket can be compared to an exoskeleton for the filtering packet holding the infusion material.

The filtering packet 2 can present any shape that fits inside the basket. It can present the shape of a pod, a cylinder or a pillow. Preferably, it presents the same shape as the basket as illustrated in FIG. 1. The nature of the filter is common as long as it enables water to pass through and retains infusion material, for example it is preferable that it retains roast and ground coffee of a particle size above 200 µm.

The apparatus comprises an actuator 13 that is configured to cooperate with the basket in order to rotate the basket on itself. In the illustrated embodiment the actuator is a motor with a shaft removably coupled to the bottom of the basket, for example through a gear engagement. Other alternative cooperation can be implemented: the actuator can be positioned at the top of the apparatus and can cooperate with the top of the basket.

The bottom of the basket comprises blades 121 designed to create an axial flow of water inside the brew container when the actuator is actuated.

Specifically, as illustrated by arrows in dotted lines, when the shaft of the motor rotates in the counter clockwise direction around axis XX', the design of the blades 121 urges water to flow inside the basket and the filtering packet 1 and along the direction of the central axis of the basket, that is upwardly in the illustrated embodiment. The flow passes through the packet and the basket up to the top of the basket. The flow exits at the top of the basket and water is recirculated back to the bottom of the brew container along the path in between the internal side wall of the brew container and the external side wall of the basket in a loop.

By controlling the movement of water in the brew container, and precisely by forcing water to enter the filtering packet, in loop movement, efficient brewing is obtained. In particular, even if water is cold, efficient infusion can be obtained, particularly in a reduced time length.

In a less preferred embodiment, the shaft of the motor can be rotated in the clockwise direction around axis XX', then the design of the blades 121 urges water to flow inside the basket and the filtering packet 1 and along the direction of the central axis of the basket, in the direction opposed to what is illustrated in FIG. 1, that is downwardly. The flow is sucked by the blades through the packet and the basket from the top down to the bottom of the basket. This embodiment is less preferred because, depending on the shape of the filtering packet and the speed of the rotation, the downwardly oriented flow of fluid may have the effect of slightly squeezing the filtering packet of infusion material against the bottom wall of the basket with the effect of limiting the free movement of infusion material compared to the preferred embodiment implementing the upwardly axial flow.

In an alternative embodiment, not illustrated, the blades can be positioned at the top of the basket and designed again to force water to enter inside the basket and create an axial flow of liquid inside the basket, said being oriented either downwardly or preferably upwardly, as mentioned above.

In the illustrated embodiment, the blades radially extend from the centre of the bottom wall. All of them are identical.

Figure 2A:
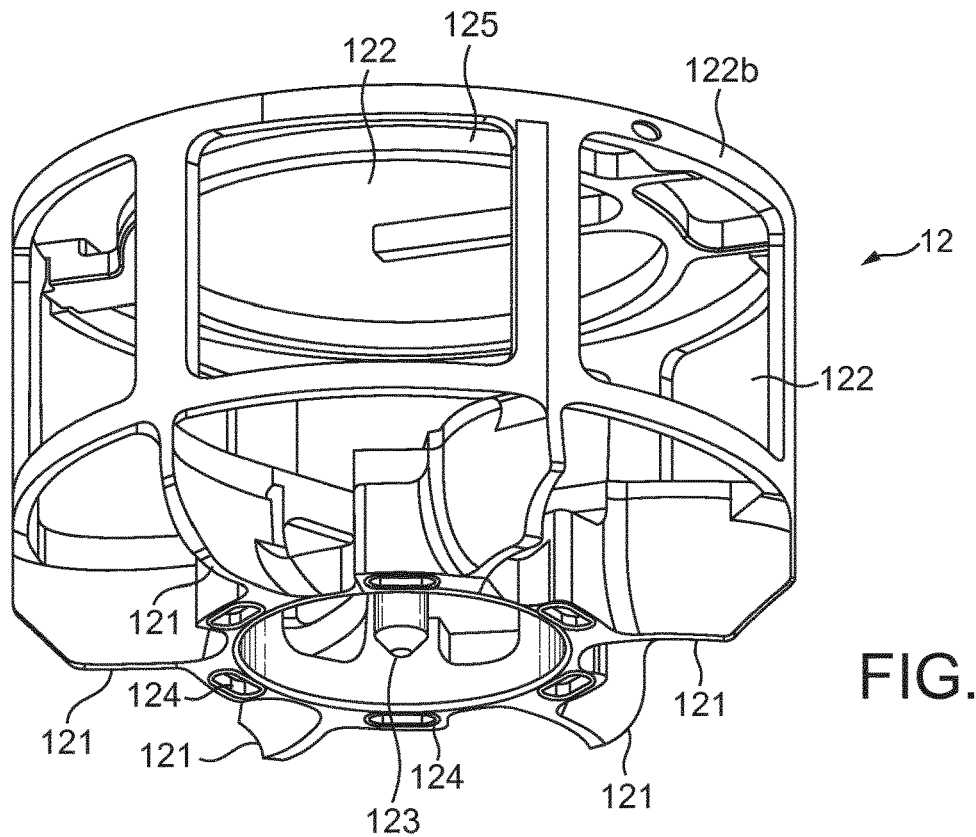
FIGS. 2A to 2C are isolated views of the basket of the apparatus of FIG. 1.

FIG. 2A is an isolated view of an alternative basket 2. It presents the same features as the basket of FIG. 1 except that it is provided with six magnets 124 and a positioning means 123 at its bottom. These magnets enable magnetic coupling of the basket with a rotating magnetic field generated by a corresponding actuator of the apparatus (not illustrated). The central bump 123 is configured to engage with a hole in the bottom surface of the brew container in order to correctly position the basket.

This embodiment shows how large are the openings 122 either at the top wall, the lateral side wall or the bottom wall in order to enable the soaking of the content of the basket inside water and the easy movement of water through the openings at the top and the bottom of the basket, the lateral openings being less critical. The top wall is an openable lid 125. It is attached to the side wall through hinges 122b and comprises an attaching part 122a designed for engaging with the upper part of the lateral side wall in order to close the basket with the lid.

Figure 2B:
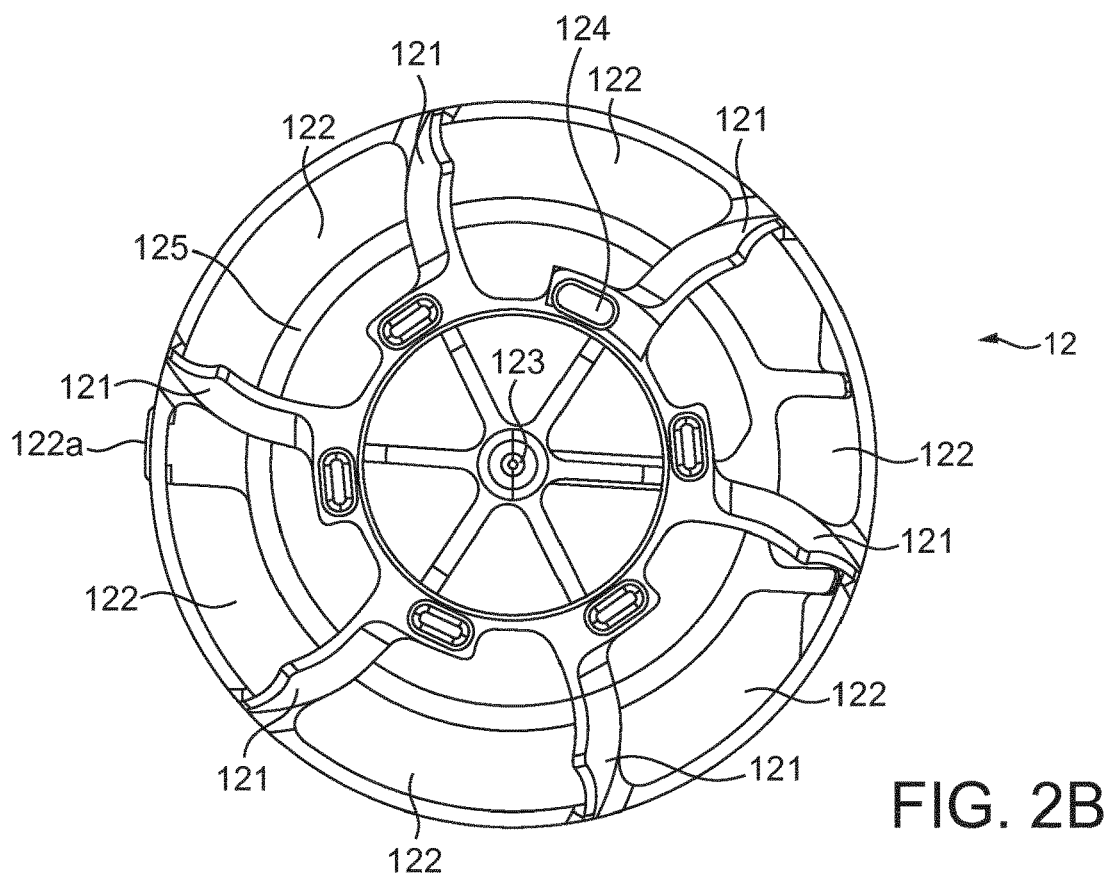

FIG. 2B is a bottom view of the basket 2 of FIG. 2A. It makes apparent that the bottom wall of the basket comprises six blades oriented to force water to enter the basket. The blades extend radially. They are sufficiently long to create axial flows of water through a major portion of the cross area of the basket. The portion at the centre of the bottom wall—extending from the central bump 123 to the circle defined by the six magnets—faces the actuator part of the apparatus.

Figure 2C:
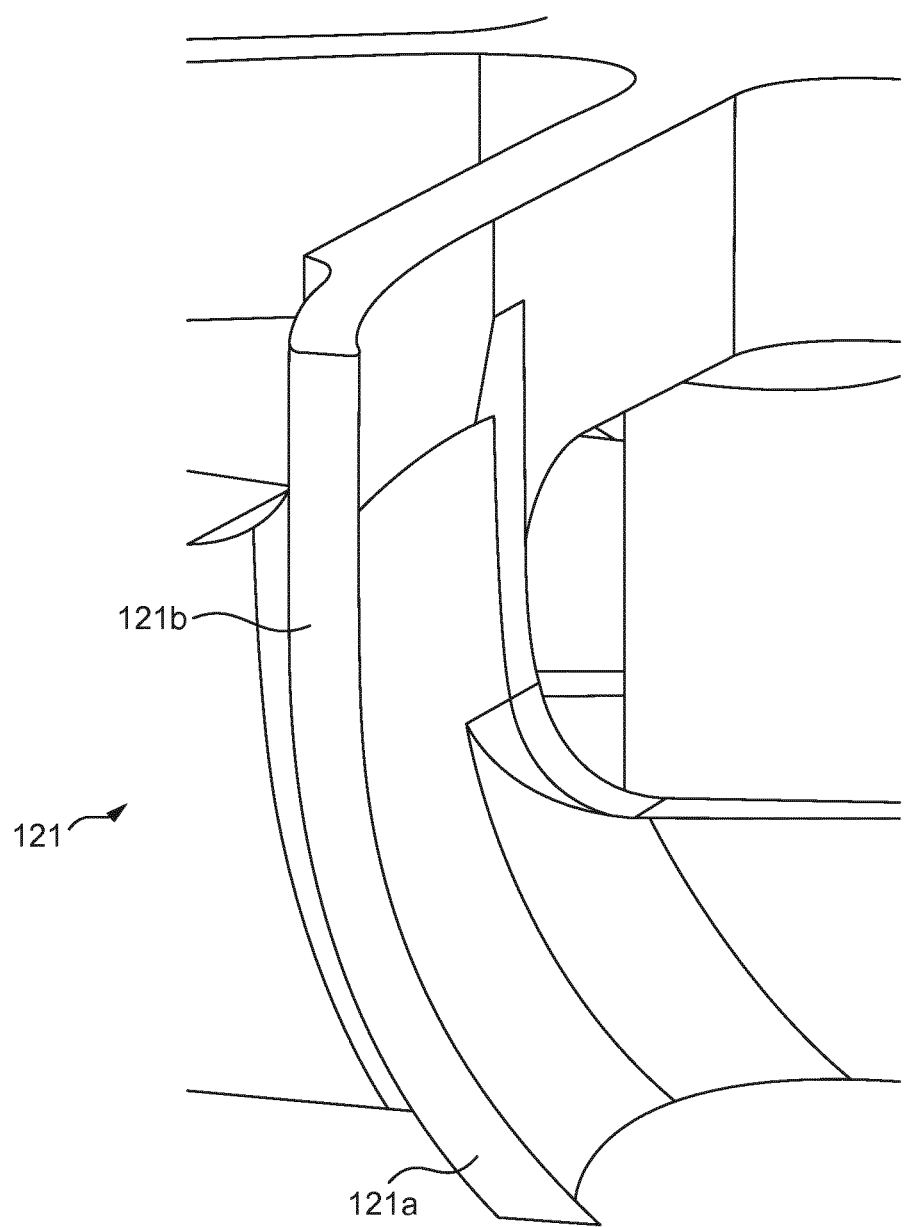

FIG. 2C is a vertical section of one of the blades 121 of the basket of FIG. 1 or FIG. 2A. The blades 121 are slightly curvedly inclined at their external bottom end 121*a* and then fully straight at the upper part 121*b*. Accordingly, for each blade, the counter clockwise rotation creates a tangential flow of water at the bottom end of the blades, this flow being rapidly transform in an upwardly axial flow as it is guided along the upper part of the blade. In the case of a basket with blades positioned at the top of the basket, blades present symmetrical design to the illustrated ones in order to create a similar axial flow.

Figure 3A:
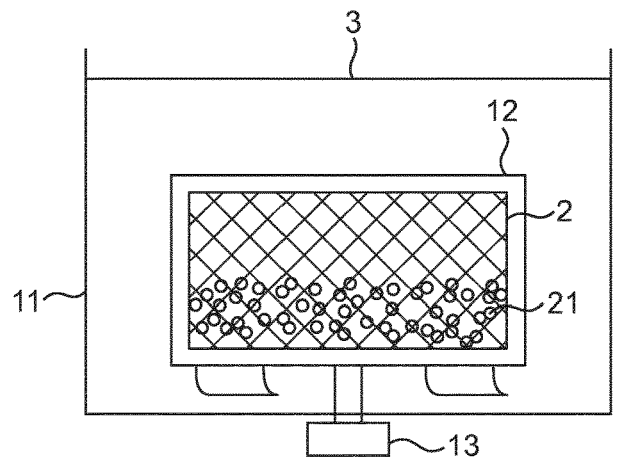
FIGS. 3A to 3C illustrate schematically three steps implemented in the method of the present invention.
Figure 3B:
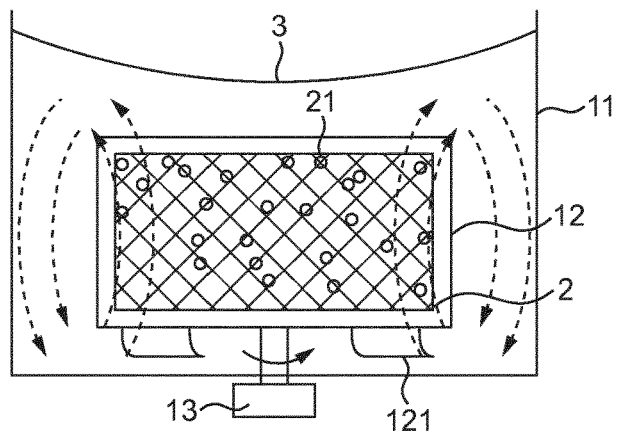

FIG. 3A to 3B illustrates the different steps implemented with the apparatus during the process of brewing in the case of roast and ground coffee. A similar process can be applied for tea leaves.

FIG. 3A illustrates the apparatus of FIG. 1 at the stage where the filtering packet 2 has been introduced in the basket 12, the basket has been introduced in the brew container 11 and the brew container has been filled water in order to submerge the basket. When roast and ground coffee is the infusion material, preferably less than 50% of the internal volume of the packet is filled with dry roast and ground coffee 21. Coffee 21 lies down at the bottom of the basket and inside the filtering packet. An important headspace 22 is visible above coffee.

FIG. 3B illustrates the apparatus of FIG. 1 at the stage of brewing where the actuator 13 rotates the basket 12 at a relatively slow speed in order to create flows of water inside the basket. The blades forces water to enter the packet through the bottom of the basket and to raise axially up to the top of the basket. Then water exits the basket at its top and flows back to the bottom along the lateral side of the brew container due to the centrifugal movement imparted by the rotation of the basket inside the brew container. The rotation is controlled to avoid that the level of water 3 decreases too low at the middle of the brew container 11 and that the basket is not immersed any longer at that place. Preferably, the rotation is just sufficient to create the axial flow of water and the loop circulation.

During this operation, the flow of water agitates ground coffee. Coffee ground is not compacted any longer, each ground is able to move freely and loosely inside the filtering pack and inside water. Extraction is increased. The effect is emphasized by the large headspace in the filtering packet, enabling particle of coffee to fly freely in the basket. This loose retention of particles inside the filtering packet enables also a free movement of water inside the basket, in particular the axial movement of water inside the basket is not hindered by a compacted cake of coffee particles. Water can flow optimally around the particles.

This illustrated rotation step can be implemented sequentially or continuously. In case of sequential rotation, coffee is suspended and agitated in water and then falls down at the bottom of the basket for a quiet period. The rotating operation is repeated later. Preferably the rotation periods are far shorter than the quiet periods.

Figure 3C:
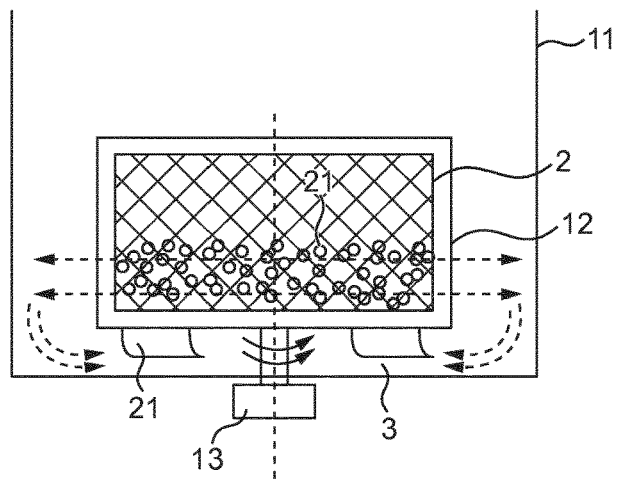

FIG. 3C illustrates the apparatus of FIG. 1 once brewing is finished and brewed coffee has been already dispensed from the brew container 1, usually from a dispensing outlet at the bottom of the brew container. In order to evacuate liquid remaining in the filtering packet 2, the actuator rotates the basket 12 at high speed in order to centrifuge the filtering packet 2. Remaining water flows radially out of the filtering packet and then to the bottom of the brew container. After centrifugation, the basket can be removed from the brew container and the filtering packet 2 can be removed from the basket with no risk of dripping.

Figure 4:
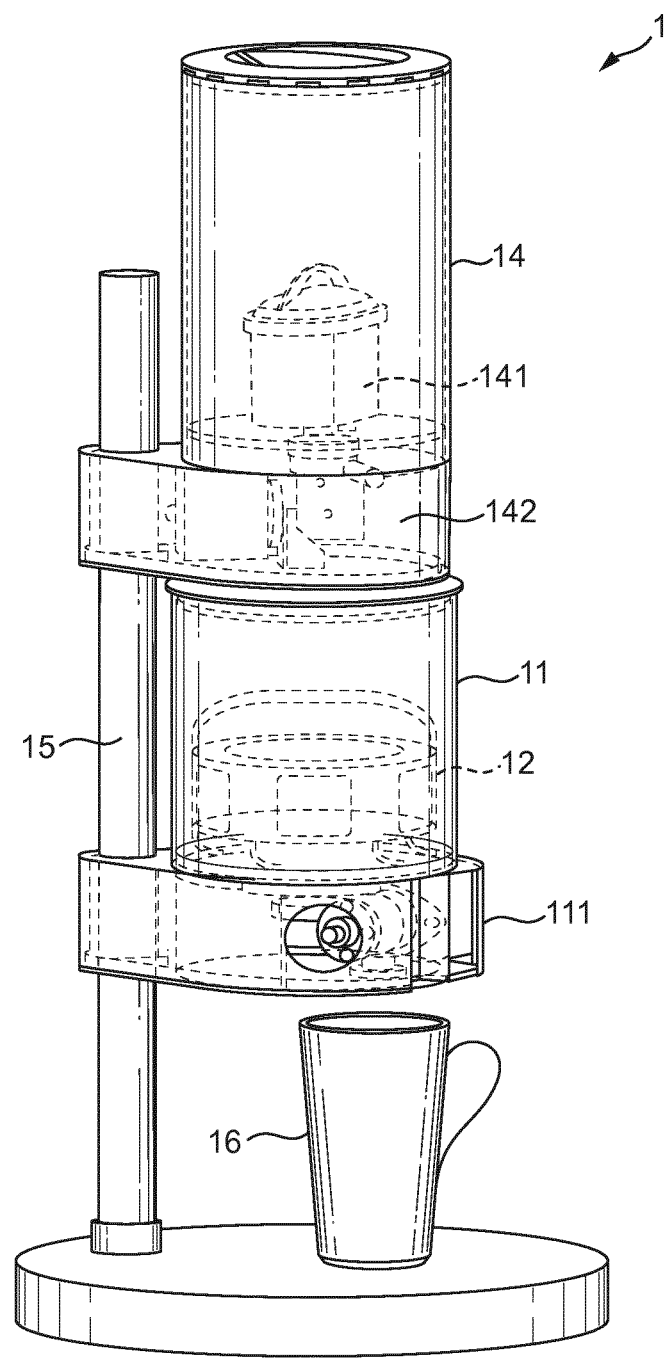
FIG. 4 illustrates a particular embodiment of the apparatus according to the invention.

FIG. 4 illustrates an apparatus 1 according to the invention comprising a water supply tank 14. This tank comprise a water outlet equipped with a water valve 142. A water filter is provided upstream this valve in order to supply filtered water to the brew container 11. The water supply tank is attached to a support 15 through a rotating connection enabling the positioning of the tank 14 either above the top of the brew container 11 as illustrated or away, for example in order to enable the operator to introduce or remove the basket 2 from the brew container.

The bottom of the brew container is equipped with a dispensing valve 111. The brew container is attached to the support 15 at such a height that it is possible to position a dispenser container 16 under the outlet of the dispensing valve.

In one first mode, the dispenser container 16 can present a volume sufficient to hold all the liquid volume brewed in the brew container 11 and, in that case, it is preferable to dispense the whole brewed coffee in the dispenser container 16 at the end of the time of the brewing in order to stop extraction. Then the dispenser container 16 can be stored in a fridge and/or used for consumption. The basket 12 can be centrifuged immediately further and removed from the brew container in order to prepare a new batch of cold brewed coffee with a new filtering packet of ground coffee.

In one second less preferred mode, the dispenser container can present the volume of one single serve beverage. It can be a glass or a mug. In that case, at the end of the time of the brewing, rotation of the basket 2 is simply stopped and cold brewed coffee is stored in the brew container. As a result brewing is slowed down but not fully stopped. Operators or consumers can dispense glasses of cold brewed coffee until the brew container is almost empty. Once this container is empty, the basket 12 can be centrifuged and removed from the brew container in order to prepare a new batch of cold brewed coffee with a new filtering packet of ground coffee.

FIG. 4 shows the basket with a handle at its top in order to facilitate handling.

The apparatus and the method of the present invention enables the preparation of 1 litre of cold brewed coffee from 60 grams of roast and ground coffee in less than 30 minutes.

On account of the rotation of the basket at a slow speed during brewing, in particular of at most 200 rpm, the resulting cold brewed coffee presents a low level of turbidity.

Due to the end centrifugation step, no dripping happens during the removal of the coffee packet from the brew container or during the removal of the cartridge.

For a professional operator, the use of filtering packet presents the advantage of avoiding the need for grinding and weighing roast coffee before each preparation.

The same device (the rotating actuator) is used to speed up brewing and to expel water from the packet in a final step. The apparatus remains simple in costs and use.

Although the invention has been described with reference to the above illustrated embodiments, it will be appreciated that the invention as claimed is not limited in any way by these illustrated embodiments.

Variations and modifications may be made without departing from the scope of the invention as defined in the claims. Furthermore, where known equivalents exist to specific features, such equivalents are incorporated as if specifically referred in this specification.

As used in this specification, the words "comprises", "comprising", and similar words, are not to be interpreted in an exclusive or exhaustive sense. In other words, they are intended to mean "including, but not limited to".

LIST OF REFERENCES IN THE DRAWINGS apparatus 1
brew container 11
   dispensing valve 111
basket 12
   blades 121
   openings 122
   positioning coupling 123
   magnetic coupling 124
   openable lid 125
   actuator 13
   shaft 131
water supply tank 14
   water filter 141
   water valve 142
support means 15
dispenser container 16
filtering packet 2
   roast and ground coffee 21
   headspace 22
water 3

The invention claimed is:

1. An apparatus for brewing infusion material, the infusion material being held in a filtering packet, the apparatus comprising:
a brew container configured for holding water and the filtering packet of the infusion material, and
a basket configured for holding the filtering packet and configured for being held in the brew container, the basket comprising a bottom wall, a top wall and a lateral side wall, the side wall extending from the bottom wall to the top wall, and the bottom and top walls comprising openings,
an actuator to rotate the basket on itself inside the brew container around a central axis extending between the top wall and the bottom wall, and
wherein the basket comprises blades, the blades being configured to generate an axial flow of water through the basket, when the basket is rotated within the brew container filled with the water.

2. The apparatus according to claim 1, wherein the blades form an axial flow impeller.

3. The apparatus according to claim 1, wherein the bottom wall or the top wall comprises coupling means cooperating with the actuator.

4. The apparatus according to claim 1, wherein the brew container comprises a dispensing valve, preferably a pinching valve.

5. A method for brewing a beverage using an apparatus for brewing infusion material, the infusion material being held in a filtering packet, the apparatus comprising a brew container configured for holding water and the filtering packet of the infusion material, and a basket configured for holding the filtering packet and for being held in the brew container, the basket comprising a bottom wall, a top wall and a lateral side wall, the side wall extending from the bottom wall to the top wall, and the bottom and top walls comprising openings, an actuator to rotate the basket on itself inside the brew container around a central axis extending between the top wall and the bottom wall, and wherein the basket comprises blades, the blades configured to generate an axial flow of water through the basket, when the basket is rotated within the brew container filled with the water, comprising the steps of:
positioning the filtering packet of infusion material in the basket, and the basket in the brew container,
introducing water in the brew container so that the filtering packet is immersed in water, and
brewing the infusion material by rotating the basket on itself inside the water and generating an axial flow of the water through the basket.

6. The method according to claim 5 wherein, during the brewing, the actuator rotates the basket at a speed of at most 200 rpm.

7. The method according to claim 5, wherein the rotating of the basket is discontinuous.

8. The method according to claim 5, wherein the method comprises the further step of dispensing the beverage either totally or partly.

9. The method according to claim 8, wherein the method comprises centrifuging the filtering packet by rotating the basket during or after the dispensing step.

10. The method according to claim 5, wherein:
the filtering packet holds roast and ground coffee, and
the filtering packet defines an internal volume, and less than 50% of the internal volume is filled with the roast and ground coffee.

11. The method according to claim 5, wherein the water and the roast and ground coffee are introduced in the apparatus in a ratio of 50 to 100 g of the roast and ground coffee for 1 l of the water.

12. The method according to claim 5, wherein the water is introduced at a temperature of at most 30° C.

13. A system for preparing a beverage, the system comprising:
a filtering packet of infusion material; and
an apparatus comprising a brew container, the brew container configured for holding water and the filtering packet of infusion material, and the apparatus further comprising a basket configured for holding the filtering packet and configured for being held in the brew container, the basket comprising a bottom wall, a top wall and a lateral side wall, the side wall extending from the bottom wall to the top wall, and the bottom and top walls comprising openings, the apparatus further comprising an actuator to rotate the basket on itself inside the brew container around a central axis extending between the top wall and the bottom wall, and wherein the basket comprises blades, the blades being configured to generate an axial flow of water through the basket, when the basket is rotated within the brew container filled with water.

14. The system according to claim 13 wherein:
the filtering packet holds roast and ground coffee, and
the filtering packet defines an internal volume, and less than 50% of the internal volume is filled with roast and ground coffee.

15. The system according to claim 13 wherein:
a code is associated to the filtering packet,
the apparatus comprises a code reader configured to read the code,
wherein the code provides information related to a nature of the infusion material, brewing parameters or combinations thereof, and
the apparatus is configured to apply the brewing parameters or to define the brewing parameters based on the read information.

16. The apparatus according to claim 4, wherein the dispensing valve is a pinching valve.

17. The method of claim 9, wherein, during the centrifuging, the actuator rotates the basket at a speed of 120 rpm or above.

18. The method of claim 5, wherein the actuator rotates the basket in a counter clockwise direction.

19. The method of claim 5, wherein the axial flow of the water through the basket flows from the bottom wall to the top wall.

20. The method of claim 5, wherein the basket further comprises one or more magnets, and the one or more magnets are coupled to a rotating magnetic field generated by the actuator.

* * * * *